(12) United States Patent
Hetzler et al.

(10) Patent No.: US 7,615,271 B2
(45) Date of Patent: Nov. 10, 2009

(54) METHOD OF FUSING A COMPONENT TO A MEDICAL STORAGE OR TRANSFER DEVICE AND CONTAINER ASSEMBLY

(75) Inventors: Kevin George Hetzler, Sparta, NJ (US);
Thea Lubrecht, Randolph, NJ (US);
Roger William Groskopf, Saddle Brook, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 10/364,629

(22) Filed: Feb. 11, 2003

(65) Prior Publication Data
US 2003/0129337 A1 Jul. 10, 2003

Related U.S. Application Data

(63) Continuation of application No. 09/835,754, filed on Apr. 16, 2001, now abandoned.

(51) Int. Cl.
| | |
|---|---|
| B32B 27/08 | (2006.01) |
| B29C 47/00 | (2006.01) |
| B65D 39/00 | (2006.01) |
| H01H 29/02 | (2006.01) |
| H01H 29/20 | (2006.01) |

(52) U.S. Cl. .......... 428/35.7; 428/36.8; 428/36.9; 215/200; 215/232

(58) Field of Classification Search .......... 428/35.7, 428/36.9, 36.6, 36.8; 215/200, 232, 233, 215/234, 263, 299, 362, 256, 305, 225, 295, 215/343–346, 258, 247, 213, 253, 274, 352, 215/316, 296–300, 292, 320, 363, 355; 604/256, 604/218, 181, 187
See application file for complete search history.

(56) References Cited

U.S. PATENT DOCUMENTS
3,051,343 A * 8/1962 Pappas .......... 215/269

(Continued)

FOREIGN PATENT DOCUMENTS
EP 0 436 372 A2 7/1991

(Continued)

OTHER PUBLICATIONS

CRC Handbook of solubility Parameters and Other Cohesion Parameters, Second Edition Allan F. M. Barton, Ph.D. pp. 422-429, 1991.

(Continued)

*Primary Examiner*—David R Sample
*Assistant Examiner*—Catherine Simone
(74) *Attorney, Agent, or Firm*—David M. Fortunato; Hoffmann and Baron LLP

(57) ABSTRACT

A method of fusing a component to a sterilized storage or delivery device formed of a cyclic olefin polymer which includes forming the storage or delivery device from a cyclic olefin polymer, forming a second member or component having at least a surface layer formed of the second polymer, wherein the Hansen relative energy distance Ra/Ro of the second polymer relative to the cyclic olefin polymer is equal to or less than 0.7, applying the second member to the storage or delivery device, and heating the assembly to the sterilization temperature, thereby causing the second polymer to chemically interact with the cyclic olefin polymer, fusing the second component to the storage or delivery device. The preferred embodiment of the invention is a medical container, such as a vial, wherein the vial is formed of a cyclic olefin polymer and the cap, closure or collar is formed of a second polymer heat fused to the vial or container.

9 Claims, 2 Drawing Sheets

U.S. PATENT DOCUMENTS

| | | | | |
|---|---|---|---|---|
| 3,504,817 | A | * | 4/1970 | Heider ........................ 215/232 |
| 3,851,783 | A | * | 12/1974 | Braginetz, Paul A. ....... 215/232 |
| 3,919,227 | A | | 11/1975 | Andreades et al. .......... 260/85.5 |
| 4,248,356 | A | * | 2/1981 | McCarthy et al. ........... 215/344 |
| 4,512,486 | A | * | 4/1985 | Kobayashi et al. .......... 215/249 |
| 4,893,636 | A | * | 1/1990 | Cook et al. .................. 600/577 |
| 4,992,511 | A | | 2/1991 | Yamamoto et al. ............ 525/97 |
| 4,994,313 | A | | 2/1991 | Shimizu et al. ............ 428/36.7 |
| 5,060,659 | A | * | 10/1991 | Cook et al. .................. 600/577 |
| 5,187,012 | A | | 2/1993 | Takahashi et al. ........... 428/402 |
| 5,288,560 | A | | 2/1994 | Sudo et al. ................... 428/494 |
| 5,366,812 | A | | 11/1994 | Takahashi et al. ........... 428/523 |
| 5,468,803 | A | | 11/1995 | Takahashi et al. ........... 524/553 |
| 5,561,208 | A | | 10/1996 | Takahashi et al. ........... 526/281 |
| 5,637,100 | A | | 6/1997 | Sudo ........................... 604/238 |
| 5,723,189 | A | | 3/1998 | Sudo ......................... 428/36.9 |
| 5,823,373 | A | | 10/1998 | Sudo et al. ................... 215/249 |
| 5,957,314 | A | * | 9/1999 | Nishida et al. ............... 215/249 |
| 6,090,081 | A | * | 7/2000 | Sudo et al. ................... 604/230 |
| 6,162,205 | A | | 12/2000 | Shichi et al. ................. 604/416 |
| 6,213,985 | B1 | | 4/2001 | Niedospial, Jr. ............. 604/218 |
| 6,241,112 | B1 | * | 6/2001 | Claessens et al. ........... 215/247 |
| 6,286,699 | B1 | | 9/2001 | Sudo ........................... 215/364 |
| 6,528,007 | B1 | * | 3/2003 | Sudo ........................... 264/491 |
| 6,595,961 | B2 | * | 7/2003 | Hetzler et al. ............... 604/181 |

FOREIGN PATENT DOCUMENTS

| | | |
|---|---|---|
| EP | 0 556 034 A1 | 8/1993 |
| EP | 0 203 799 B1 | 8/1996 |
| EP | 0 741 989 A1 | 11/1996 |
| EP | 0 920 989 A2 | 6/1999 |
| JP | 08258857 A * | 10/1996 |

OTHER PUBLICATIONS

CRC Handbook of Solubility Parameters and Other Cohesion Parameters, Second Edition Allan F. M. Barton, Ph.D. pp. 95-111, 1991.

Properties of Polymers—Their Correlation with Chemical Structure; Their Numerical Estimation and Prediction from Additive Group Contributions, Third completely revised edition by D. W. Van Krevelen , 1990.

The Three Dimensional Solubility Parameter and Solvent Diffusion Coefficient—Their Importantce in Surface Coating Formulation, by Charles M. Hansen (Copenhagen Danish Technical Press, 1967).

"Evaluating environmental Stress Cracking of Medical Plastics" from Medical Plastics and Biomaterials, May/Jun. 1998.

Article by Charl3es M. Hansen and Lisbeth Just, Force Institute, Brondby, Denmark, 2000.

* cited by examiner

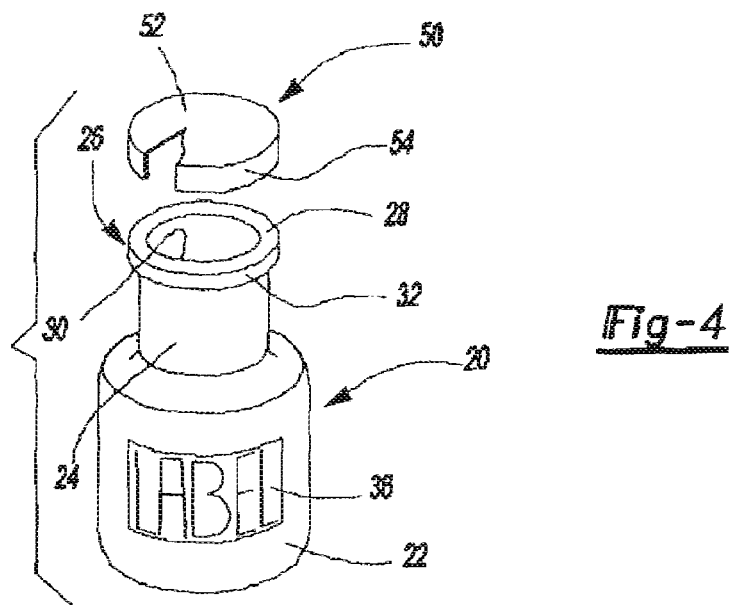
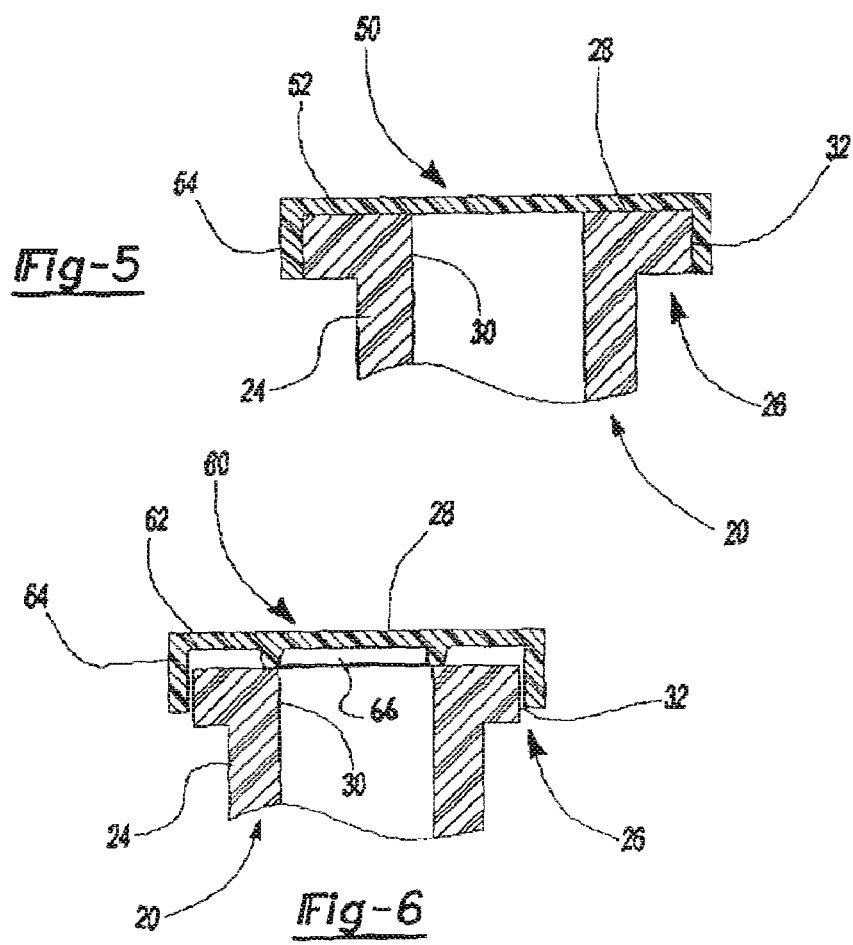

METHOD OF FUSING A COMPONENT TO A MEDICAL STORAGE OR TRANSFER DEVICE AND CONTAINER ASSEMBLY

CROSS-REFERENCE TO RELATED APPLICATIONS

The present application is a continuation of U.S. application Ser. No. 09/835,754 filed Apr. 16, 2001 which is now abandoned.

BACKGROUND OF THE INVENTION

The present invention relates to medical transfer and storage devices wherein a major component is formed of a cyclic olefin polymer and a second component fused to such cyclic olefin polymeric component. A preferred embodiment of this invention is a sealed sterilized container and closure assembly, such as a sealed vial or transfer set, wherein the closure or collar is fused on the open end of the vial.

The development of cyclic olefin polymers has suggested the use of such polymers for the manufacture of medical devices because such polymers are transparent, exhibit excellent chemical resistance, and may be sterilized by autoclaving or the like without damage. However, the Applicant has found that certain polymers will chemically react with and fuse to cyclic olefin polymers at elevated temperatures required for sterilization, limiting the use of cyclic olefin polymers for medical devices, including medical transfer and storage devices. The Applicant proposes to utilize this apparent disadvantage to fuse a component of a medical storage or delivery device to a cyclic olefin polymeric component, such as a closure on a vial formed of a cyclic olefin polymer.

A conventional vial for storing a medicament, drug or vaccine includes an open end, a radial rim portion surrounding the open end, and a reduced diameter neck portion adjacent the rim portion. The vial is conventionally sealed with an elastomeric stopper which generally includes a tubular portion inserted into the neck of the vial and a planar rim portion which overlies the vial rim. The stopper is normally secured to the vial with a thin malleable metal cap, such as aluminum. The aluminum cap includes a tubular portion which surrounds the rim portions of the stopper and vial, an inwardly projecting annual portion which overlies the rim portion of the stopper and a distal end portion which is crimped or deformed radially into the neck portion of the vial, beneath the vial rim portion. Because aluminum is malleable, the collar accommodates build-up of tolerances of the dimensions of the stopper and vial rim. The dimensions and tolerances of standard vials and stoppers are set by the International Organization for Standards (ISO).

The rim portion of the aluminum cap which covers the stopper rim portion may be closed, in which case the aluminum cap is removed by "peeling" the aluminum cap from the vial. A pre-slit tab located in the mid-portion may be provided which overlies the vial rim, permitting the cap to be torn away from the top and peeled from the vial prior to use. This method of sealing a vial has several disadvantages. First, the tearing of the metal cap creates sharp edges which may cut or damage sterile gloves and cut the person administering the medicament, drug, or vaccine, thereby exposing both the healthcare worker and the patient to disease and contamination of the content of the vial. Second, tearing of the aluminum cap generates metal particles which may also contaminate the content of the vial. The dangers associated with the tearing of an aluminum cap have been solved in part by adding a "flip-off" plastic cap. The plastic cap is then removed by forcing the flip-off cap away from the aluminum collar, which tears an annular serrated portion surrounding the central opening and exposing an opening in the collar for receipt of a hypodermic needle or the like. This embodiment reduces, but does not eliminate the possibility of tearing the sterile gloves of a health care worker. More importantly, however, aluminum dust is still created which may contaminate the contents of the vial. It is also important to note that metallic dust is created by forming and affixing an aluminum collar to the vial because aluminum dust is created in forming the aluminum collar, crimping the collar and removing the flip-off plastic cap. Aluminum collars are also used to secure a fluid transfer set on medical vials. Transfer sets may be utilized, for example, to transfer liquid from a syringe to a vial, such as to reconstitute a dry or powder drug in a vial, by adding a diluent or solvent. The reconstituted drug may then be withdrawn from the vial by a syringe. The inner surface of the transfer set may be part of the drug fluid path and the aluminum collar or ring may bring particles in the sterile room where the drug is added to the vial or into the fluid path contaminating the medicament, drug or vaccine.

More recently, the Applicant has developed plastic closures for vials and transfer sets and a method of crimping a plastic closure on a vial as disclosed in a co-pending application. However, this method of securing a closure on a vial requires a separate crimping step prior to sterilization, such as autoclaving. The method of fusing a cap or closure to a vial or other medical container formed of a cyclic olefin polymer of this invention solves these problems by utilizing the apparent "disadvantage" of cyclic olefin polymers which presently limit the use of such polymers for sterilizable storage and delivery devices.

SUMMARY OF THE INVENTION

As set forth above, the present invention relates to sterilizable or sterilized medical transfer or storage devices, such as vials, transfer sets, syringes, injection devices and the like, wherein a first component, generally the major component, is formed of a cyclic olefin polymer and the device includes a second component, such as a closure, label or the like, formed of a second polymer fused to the first component, wherein the relative energy distance Ra/Ro of the second polymer relative to the cyclic olefin polymer is equal to or less than 0.7 or more preferably equal to or less than about 0.5. The second component is also preferably formed of a polymer having a lower molecular weight, less than about 5,000 to promote fusing. Following assembly of the components, the method then includes heating the storage or delivery device to the sterilization temperature, thereby causing the second polymer to chemically interact with the cyclic olefin polymer, fusing the second member to the storage or delivery device. The preferred method of sterilization is autoclaving which heats the polymers to 120 to 125° C. for 30 to 60 minutes and fuses the polymers as described. The polymer or polymers selected for the second member or component of the sterilizable storage or delivery device and method of this invention is based upon solubility and cohesion properties explained by Hansen in *"The Three Dimension Solubility Parameter and Solvent Diffusion Coefficient"* by Charles M. Hansen, Copenhagen Danish Technical Press (1967) and the Hansen values for polymers are reported in Chapter 14 of "The Handbook of Solubility Parameters and Cohesion Parameters" Edited by Allen F. M. Barton (1999). Each material is defined by three points in 3D space and these three points are known as the Hansen Solubility Parameters (HSP). The Hansen Solubility Parameters may be defined as follows.

The Hansen solubility region consists of a point in 3D space defined by a non-polar dispersion interaction (Delta-D) axis, a polar or dipole interaction (Delta-P) axis and hydrogen bonding interaction (Delta-H) axis. From the location (Delta-D, Delta-P, Delta-H), a radius is projected to form a sphere which encompasses the region where liquids having HSP parameters within the inside of this sphere are generally the "attacking" the material in question, and liquids outside of the sphere are generally not attacking the material in question (See also *"Environmental Stress Cracking In Plastics,"* Hansen and Just, Pharmaceutical and Medical Packaging (1999), Vol. 9, 7.1 to 7.7, ISBN 87-89753-26-7). Hansen also noted that higher stress/temperature levels will enlarge the sphere (increase the radius) as well as the size and shape of the liquid molecules. Generally, the larger the molecule, the harder it is for the molecule to attack the material in question. The assignee of this application has noted material interactions under ambient conditions, but material interaction is found more frequently at elevated temperatures, such as during autoclaving and annealing. As set forth above, however, the perceived problems associated with material interaction between cyclic olefin polymers and the polymers conventionally used for components of medical devices has limited the use of cyclic olefin polymers in medical transfer and storage devices.

The distance between the HSP coordinate of polymer A to HSP coordinates of another material (liquid or Polymer B) is defined as Ra. The radius of the Polymer A sphere is defined as Ro. Ra/Ro is now defined by Hansen as the Relative Energy Distance (RED). Hansen reports that if Ra/Ro is less than 1, the two materials may stress crack or dissolve each other. If Ra/Ro is greater than 1, the materials do not have an affinity to one another under standard conditions. Ro is determined through experimentation described by Hansen, and the 3D distance, Ra, is defined by the equation:

1=polymer
2=liquid ($2^{nd}$ solid in this disclosure) and
RED=Relative Energy Distance=Ra/Ro
Ra/Ro is inside the polymer sphere if it is less than 1
Ra/Ro is on the surface of the sphere if it is 1
Ra/Ro is outside the polymer sphere if it is greater than 1.

For Ticona Topas, a cyclic olefin copolymer, the Hansen Solubility Parameters have been reported by Hansen to be:
Delta-D=18.0, Delta-P=3.0 and Delta-H=2.0 and Ro=5.0

For Ticona Topas cyclic olefin copolymers that have seen cracking, the Hansen Solubility Parameters have been reported by Hansen to be:
Delta-D=17.3, Delta-P=3.1 and Delta-H=2.1 and Ro=6.4.

Thus, the larger the Hansen solubility difference between two polymers, the less likely the polymers will interact and the smaller the solubility difference between two polymers, the more likely the polymers will interact. Experimentation has shown that this difference is particularly important in the use of cyclic olefin polymers in medical devices which must be sterilized before use. As stated above, Hansen has also found that an increase in temperature will enlarge the sphere of interaction. For example, the Applicant experimented with syringe assemblies having a barrel formed from a cyclic olefin polymer and a plunger stopper conventionally formed of a bromo-butyl rubber polymer. Upon sterilization by autoclaving, the bromo-butyl rubber polymer stopper fused to the cyclic olefin polymeric barrel resulting in a breakloose force of approximately 4.5 kg. rendering the syringe assembly inoperative. Further experimentation by the Applicant determine that this problem could be overcome by selecting a polymer for the plunger stopper wherein the relative energy distance Ra/Ro of the polymer selected for the stopper relative to the cyclic olefin polymer was greater than 0.8 or more preferably greater than 1. This discovery is the subject of a separate patent application filed concurrently herewith.

As set forth above, the method of fusing a component of a sterilizable storage or delivery device to a cyclic olefin polymeric component of this invention utilizes this apparent problem by selecting polymers within the range of interaction or the Hansen relative energy distance Ra/Ro. In the preferred embodiments of this invention, the cyclic olefin polymeric component is the major component to take advantage of the superior property of such polymers, including transparency, chemical resistance, etc. The second component is then formed of a second polymer wherein the relative energy distance Ra/Ro of the second polymer relative to the cyclic olefin polymer is equal to or less than 0.7, or more preferably about 0.5 or less. The second polymer may then include butyl rubber polymers, nitrile butadiene and isoprene elastomers. The second member may be formed of the second polymer or the second member may be formed of a composite or laminate, wherein the interface layer is formed of the second polymer, such as a label.

A preferred embodiment of the sterilized storage or delivery device is a container formed of a cyclic olefin polymer, such as a medical vial. The container is then sealed by applying a closure over the open end of the container formed of the second polymer, wherein the relative energy distance Ra/Ro of the second polymer relative to the cyclic olefin polymer is less than 0.7 or more preferably about 0.5 or less and heating the closure to the sterilization temperature, fusing the closure to the rim portion of the container and sealing the container. In the most preferred embodiment of a sealed container, wherein the container is a medical vial formed of a cyclic olefin polymer, the closure includes a portion overlying the rim portion of the container and a tubular portion surrounding the vial rim portion in contact with the external surface and the enclosure rim portion is also fused to the external surface of the vial rim portion. This embodiment assures proper orientation of the closure on the vial prior to sterilization. The closure may have a closed end portion for sealing a vial or utilized to secure a transfer set to a vial, wherein the closure includes an opening through the end portion and the radial portion is fused to a radial portion of the transfer set, for example.

The sealed container and method of this invention thus eliminates the problems associated with malleable metal caps, such as aluminum, and eliminates crimping of metal or plastic closures, collars and caps. Other advantages and meritorious features of the method of fusing a component to a sterilized storage or delivery device and sealed container of this invention will be more fully understood from the following description of the preferred embodiments, the appended claims and the drawings, a brief description of which follows.

BRIEF DESCRIPTION OF THE DRAWINGS

FIG. 4 is an exploded perspective view of an alternative embodiment of a vial and cap assembly;

FIG. 5 is a partial side cross-sectional view of the cap and vial illustrated in FIG. 4 following fusing of the cap to the vial; and FIG. 6 is a partial side cross-sectional view of an alternative embodiment of the cap and vial assembly illustrated in FIG. 4 following fusion.

DETAILED DESCRIPTION

Figure 1:
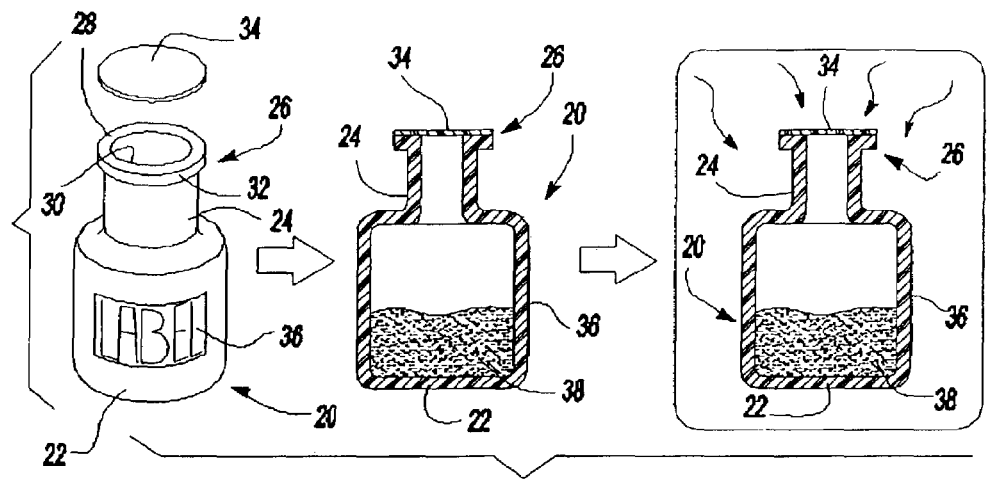
FIG. 1 illustrates the steps of the method of this invention in making a sealed container, such as a medical vial.

As described above, this invention relates to a sterilized medical transfer or storage device for delivery or storage of a medicament, drug or vaccine, wherein a component of the device, generally the major component, is formed of a cyclic olefin polymer and the second component is fused to the cyclic olefin polymeric component. As used herein, the term "cyclic olefin polymer" is intended to broadly cover the family of cyclic olefin polymers/polymers, including bridged cyclic olefin polymers, as disclosed, for example, in the patents of Nippon Zeon Co., Ltd., including, for example, U.S. Pat. No. 5,561,208 and European patent publication EP 920 989 A2. As will be understood, however, cyclic olefin polymers are available from a variety of sources including Dow Chemical Company which makes a polycyclohexylethylene, Ticona, a division of Celanese AG (formerly Hoechst Technical Polymers), which makes a cycloolefin copolymer under the tradename "Topas," and Mitsui Chemicals which makes a cycloolefin copolymer under the tradename "Apel". A suitable cyclic olefin polymer for the sterilizable transfer or storage device and method of this invention is available from Nippon Zeon Co., Ltd. under the trade name Zeonex™. As set forth above, cyclic olefin polymers have characteristics and properties which recommend the use of such polymers for medical applications, including excellent transparency, chemical resistance and stability at elevated temperatures. However, such use has been inhibited by stress cracking, particularly at elevated temperatures, and adhesion or fusion of other polymers typically used for components of such medical devices, including plunger stoppers conventionally formed of bromo-butyl rubber which fuses to the inside surface of a cyclic olefin polymeric syringe barrel. The present invention utilizes this apparent problem to fuse a component, such as a closure or label, to the cyclic olefin polymeric component as now described. As set forth above, the method of fusing a second component to a sterilizable storage or delivery device formed of a cyclic olefin polymer of this invention may be utilized to fuse various components to medical storage or delivery devices including, for example, labels on syringes, closures or collars on transfer devices and caps or closures, including vials. The invention will now be described with reference to the drawings in regard to a sealed container, such as a medical vial, for ease of description only.

The medical container 20 shown in the figures may be a conventional medical vial formed of a cyclic olefin polymer. A conventional medical vial includes a body portion 22, a reduced diameter neck portion 24 and a rim portion 26 including a planar top surface 28, an opening 30 through the rim portion and a cylindrical side surface 32. Such vials are presently sealed by inserting an elastomeric stopper (not shown) having a tubular portion received in the opening 30 and a planar rim portion overlying the planar surface 28 of the rim portion. As will be understood, however, the container 20 may be any container formed of a cyclic olefin polymer.

Figure 2:
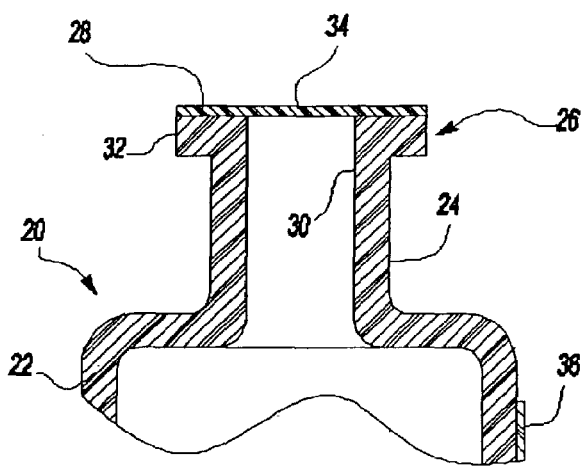
FIG. 2 is a side cross-sectional view of the top portion of the sealed vial formed by the method illustrated in FIG. 1.
Figure 3:
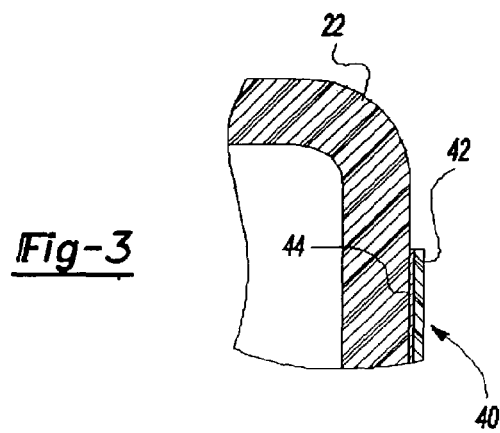
FIG. 3 is a partial side cross-sectional view of a label affixed to the sealed vial.

The closure or cap 34 in the embodiment shown in FIGS. 1 to 3 is a circular disc having a diameter generally equal to the diameter of the rim portion 26. The vial may also include a label 36 discussed further below. The cap or closure 34 is formed of a second polymer, different from the cyclic olefin polymer, wherein the relative energy distance Ra/Ro of the second polymer relative to the cyclic olefin polymer is equal to or less than 0.7 or more preferably equal to about 0.5 or less. The Hansen relative energy distance "Ra/Ro" is discussed in detail above. The disc-shaped cap 34 is then assembled on the planar surface 28 of the rim portion 26 prior to sterilization as shown in the middle drawing of FIG. 1. The vial may also contain a medicament, drug or vaccine 38 in powdered or liquid form provided the medicament, drug or vaccine may be subject to sterilization as illustrated in the right hand drawing of FIG. 1. Alternatively, a medicament, drug or vaccine may be added to the sealed vial following sterilization as discussed further below. The cap and vial assembly is then heated, fusing the cap 34 to the rim portion 26 of the vial as best shown in FIG. 2. Because the relative energy distance Ra/Ro of the polymer selected for the cap 34 relative to the vial 20 formed of a cyclic olefin polymer is equal to or less than 0.7, the polymers will chemically interact and fuse upon heating to the sterilization temperature of the polymers. In the preferred embodiment of the method of this invention, the assembled components are sterilized by autoclaving, wherein the components are heated to a temperature of between 120 to 130° C. for 30 to 60 minutes, generally about 125° C. for about 50 minutes. This assures sterilization and fusing of the components.

Similarly, the label 36 shown in FIGS. 1 and 2 is formed of a third polymer, which may be identical to the polymer selected for the cap 34, wherein the relative energy distance Ra/Ro of the third polymer relative to the cyclic olefin polymer is equal to or less than 0.7, such that the label 36 fuses to the body portion 22 of the vial when heated to the sterilization temperature of the polymers. However, the label 36 may also be formed of a composite or laminate as shown in FIG. 3, wherein the label 40 is a laminate comprising an outer layer 42 and an inner or interface layer 44 formed of a polymer or polymeric adhesive, wherein the relative energy distance Ra/Ro of the interface layer 44 is equal to or less than 0.7. The outer layer 42, for example, may be paper, foil, or any material suitable for a label, provided the interface layer or polymeric adhesive 44 is formed of a polymer which chemically interacts and fuses to the body portion 22 of the vial when heated to the sterilization temperature.

FIGS. 4 and 5 illustrate an alternative embodiment of a cap or closure 50 including a planar end portion 52 and a tubular rim portion 54. The vial 20 may be identical to the vial shown in FIGS. 1 to 3 and described above. That is, the vial includes a rim portion 26 having a planar surface 28 surrounding the opening 30 and a cylindrical outer surface 32. The diameter of the planar rim portion 54 of the cap is equal to or slightly less than the diameter of the cylindrical external surface 32 of the rim portion 26 of the vial to assure contact between the rim portion 54 of the cap and the external cylindrical surface 32 of the vial as best shown in FIG. 5. Again, the closure 50 is formed of a polymer different from the cyclic olefin polymer of the container or vial 20 or a second polymer wherein the relative energy distance Ra/Ro of the second polymer relative to the cyclic olefin polymer is equal to or less than 0.7, such that the cup-shaped cap 50 fuses to the vial as shown in FIG. 5. The cup-shaped cap 50 shown in FIGS. 4 and 5 has at least two advantages over the circular disc-shaped cap 34 shown in FIGS. 1 and 2. First, the cap 50 will remain on the vial during handling prior to and during sterilization. Second, the rim portion 54 of the cap will fuse to the external surface 32 of the rim portion 26 providing a more secure seal.

As set forth above, the vial 20 may be pre-filled with a medicament, drug or vaccine prior to sterilization, provided the medicament, drug or vaccine is able to withstand the temperature of sterilization. It is important to note, however, that the disc-shaped cap 34 and the planar portion 52 of the cap 50 is piercable by a conventional hypodermic needle cannula to either add diluent, for example, to reconstitute a powdered drug 38 or to later add a medicament, drug or vaccine to the vial after fusing the cap on the vial. The caps 34 and 50 may also include perforations to permit removal of the cap as is well known in this art. Alternatively, the cap may include an integral or separate snap-off portion to provide access to the vial as is also well known in this art. Alternatively, the cup-shaped cap 50 may include a central opening (not shown) co-axially aligned with the opening 30 of the vial which receives a tubular portion of a medical transfer set, wherein the tubular portion of the transfer set may also include a radial rim portion overlying the planar portion 28 of the vial rim. The tubular transfer member would be formed of a cyclic polyolefin, such that the planar portion 52 of the cup-shaped closure would be fused to the planar rim portion of the tubular transfer member and the rim portion 54 of the collar would be fused to the rim portion 26 of the vial. As used herein, the term "closure" is intended to be generic to either a cap or a collar.

FIG. 6 illustrates an alternative embodiment of a cap 60 having a generally planar end portion 62 and a cylindrical rim 64 as described above in regard to FIG. 5. However, the cap 60 in this embodiment includes an internal rib 66 preferably integral with the end portion 62 of the cap which is received on the top surface of the radial rim portion 32 of the vial 20 adjacent the opening 30. The purpose of the annular rib 66 is to limit the fusion of the cap 60 to the vial 20, permitting removal of the cap following fusion. In the most preferred embodiment, the annular rib 66 has a generally circular cross-section as shown in FIG. 6 to provide essentially a point or line contact between the rib and the rim portion 32 of the vial, permitting removal of the cap 60 by breaking the line contact fusion. In this embodiment, the rim portion 64 preferably has an internal diameter greater than the external diameter of the rim portion 32 of the vial to avoid fusion of the rim portions.

As set forth above, the cap or closure 60 is formed of a polymer different from the cyclic olefin polymer of the container or vial 20. Further, as set forth above, the relative energy distance Ra/Ro of the polymer selected for the cap 60 relative to the cyclic olefin polymer selected for the vial or container 20 is equal to or less than 0.7 or more preferably between about 0.3 and 0.5. Following heating of the assembly shown in FIG. 6 to the sterilization temperature, the contacting surface of the rib 66 fuses to the rim portion 32 of the vial, but can be removed by lifting the rim portion 64 of the cap or closure, breaking the line contact fusion. The same principle may be used to secure various elements or components to a cyclic olefin component. For example, a needle shield or sheath may be releaseably fused to the tip portion of a syringe barrel formed of a cyclic olefin polymer. The needle shield or sheath (not shown) would have an annular rib extending from an inner surface of the needle passage, such that the annular rib contacts the tip portion of the cyclic olefin barrel of the syringe, releaseably retaining the needle shield or sheath to the cyclic olefin barrel following sterilization as described.

As will now be understood, various modifications may be made to the method of fusing a component or second member to a sterilizable storage or delivery device formed of a cyclic olefin polymer and the sealed sterilized container and closure assembly of this invention within the purview of the appended claims. As specifically set forth above, the method of this invention may be utilized to fuse any component, such as a closure, cap or label, to a storage or delivery device formed of a cyclic olefin polymer, such as a container, vial, transfer set, syringe, barrel or injection device, thereby eliminating crimping, adhesive bonding or the like. The polymer selected for the second member or component will depend upon the application, but may be selected from any polymer having the relative energy distance described above. Suitable polymers for the second component or member include isoprene elastomers, isobutylene/isoprene polymers, nitrile butadiene, chlorobutyl rubber, butyl rubber and cis.-polybutadiene elastomers, all having a relative energy distance Ra/Ro of such polymers relative to cyclic olefin polymers of 0.7 or more preferably about 0.5 or less. Having described the preferred embodiments of the method of fusing a second component to a sterilizable storage or delivery device formed of a cyclic olefin polymer and a sealed sterilized container and closure assembly, the invention is now claimed as follows.

The invention claimed is:

1. A sealed sterilized container and closure assembly, comprising:
    a container having an open end and a closed end formed of a cyclic olefin polymer,
    a closure received over said open end of said container formed of a second polymer and thermally fused to said container open end with a direct bond between said closure and said container, said closure sealing said container, wherein the relative energy distance Ra/Ro of said second polymer relative to said cyclic olefin polymer is between about 0.3 and 0.5.

2. The sealed sterilized container and closure assembly as defined in claim 1, wherein said second polymer of said closure is selected from the group consisting essentially of butyl rubber, nitrile butadiene and isoprene elastomer.

3. The sealed sterilized container and closure assembly as defined in claim 1, wherein said closure end portion is heat sealed to said container open end.

4. The sealed sterilized container and closure assembly as defined in claim 1, wherein said container is consisting of said cyclic olefin polymer.

5. The sealed sterilized container and closure assembly as defined in claim 1, wherein said assembly is sealed solely by said closure thermally fused to said container.

6. The sealed sterilized container and closure assembly as defined in claim 1, wherein a rib extends from said closed end portion of said closure, said rib contacting, and being fused to, said container.

7. The sealed sterilized container and closure assembly as defined in claim 6, wherein said closure is fused to said container at locations of said rib contacting said container such that said rib defines point or line contact fusion between said closure and said container.

8. The sealed sterilized container and closure assembly as defined in claim 7, wherein said fusion between said rib and said container may be broken with lifting of said closure from said container.

9. The sealed sterilized container and closure assembly as defined in claim 1, wherein said container includes an annular rim portion surrounding said open end having a generally cylindrical outer surface, said outer surface being formed of cyclic olefin polymer, said closure being cup-shaped having a closed end portion and a tubular rim portion having a diameter generally equal to the diameter of said container rim portion, and said closure rim portion heat fused to said container rim portion outer surface.

* * * * *